(12) United States Patent
Studtmann

(10) Patent No.: US 7,573,831 B1
(45) Date of Patent: Aug. 11, 2009

(54) SYSTEM AND METHOD FOR ANALYZING TRANSMISSION OF BILLING DATA

(75) Inventor: Joel Mark Studtmann, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 929 days.

(21) Appl. No.: 10/882,731

(22) Filed: Jul. 1, 2004

(51) Int. Cl.
*G01R 31/08* (2006.01)

(52) U.S. Cl. .................. 370/252; 370/282; 370/301; 370/474; 370/475; 455/405; 379/114.27; 379/114.28; 379/115.01

(58) Field of Classification Search .............. 370/252, 370/282, 301, 474, 475; 455/405; 379/114.27, 379/114.28, 115.01
See application file for complete search history.

(56) References Cited

U.S. PATENT DOCUMENTS

| | | | | |
|---|---|---|---|---|
| 5,612,952 A * | 3/1997 | Motoyama | ............ | 370/412 |
| 5,799,245 A * | 8/1998 | Ohashi | ............ | 455/69 |
| 6,161,181 A * | 12/2000 | Haynes et al. | ............ | 713/170 |
| 6,182,146 B1 * | 1/2001 | Graham-Cumming, Jr. | . | 709/238 |
| 6,321,264 B1 * | 11/2001 | Fletcher et al. | ............ | 709/224 |
| 6,570,852 B1 * | 5/2003 | Suzuki | ............ | 370/235 |
| 6,922,417 B2 * | 7/2005 | Vanlint | ............ | 370/503 |
| 6,961,327 B2 * | 11/2005 | Niu | ............ | 370/338 |
| 6,965,941 B2 * | 11/2005 | Boucher et al. | ............ | 709/230 |
| 7,260,630 B1 * | 8/2007 | Mongiovi | ............ | 709/224 |
| 2002/0080792 A1 * | 6/2002 | Rosier | ............ | 370/394 |
| 2002/0129137 A1 * | 9/2002 | Mills et al. | ............ | 709/224 |
| 2004/0170129 A1 * | 9/2004 | Ishikawa et al. | ............ | 370/252 |
| 2005/0138484 A1 * | 6/2005 | Moyer et al. | ............ | 714/47 |

* cited by examiner

*Primary Examiner*—Huy D. Vu
*Assistant Examiner*—Kibrom T Hailu

(57) ABSTRACT

The present invention generally relates to a method for analyzing billing packets transmitted from a billing collector to a billing converter. A first packet of data transmitted from a billing collector to a billing converter is received. The first packet includes billing data and a transmission time. A second packet of data being transmitted from the billing converter to the billing collector is received. The second packet includes an acknowledgement of the first packet and a transmission time. A first time difference between the transmission time of the first packet and the transmission time of the second packet is determined.

17 Claims, 3 Drawing Sheets

| PORT | AVERAGE TIME PER TRANSACTION IN MS | # OF TRANSACTIONS | TOTAL TIME FOR TRANSACTIONS IN SEC | # OF RETRANSMISSIONS | TOTAL TIME STALLED IN SEC |
|---|---|---|---|---|---|
| 59306 | 0.984 | 35932 | 35.343 | 61 | 30.670 |
| 59307 | 0.966 | 35587 | 34.374 | 66 | 32.052 |
| 59308 | 0.955 | 35145 | 33.563 | 67 | 33.787 |
| 59309 | 1.020 | 36834 | 37.588 | 59 | 27.525 |
| 59310 | 0.967 | 35975 | 34.787 | 64 | 31.354 |
| 49234 | 1.246 | 29913 | 37.262 | 64 | 32.384 |
| 49235 | 1.213 | 30681 | 37.222 | 65 | 31.330 | ically has a maximum size, and if the data to be transmitted is larger than the maximum packet size, the data must be broken into multiple packets.

SYSTEM AND METHOD FOR ANALYZING TRANSMISSION OF BILLING DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the invention relates to a method and system for analyzing the transmission of billing data from a billing collector to a billing converter.

BACKGROUND OF THE INVENTION

When a telephone call is placed, received or the Internet is used, data is sent back to a network from communication devices such as mobile and fixed telecommunications lines. A billing collector, such as METAPATH application server in an External Message Interface System (EMIS), collects this raw data. EMIS provides integrated modules for billing, customer care, tariff management, and network services. EMIS supports the communication market for mobile, fixed line, Internet and IP. This data is transferred as packets to a billing converter, such as MAF application server. When being transferred, the billing data must be sent though a firewall. Millions of records of billing data are sent per second from the billing collector to the billing converter. There are approximately forty records per packet. The billing converter converts the raw billing data into a format that it can be used for billing purposes.

Due to the volume of data transferred from the billing collector to the billing converter, the transmission of data cannot be manually analyzed. The volume of data being transferred from the billing collector to the billing converter also makes it difficult for a network analysis tool such as a sniffer to be used to analyze the transfer of data from the billing collector to the billing converter. As such, if a slowdown or backlog occurs in the transmission of billing data, it is difficult to troubleshoot or debug the cause of the slowdown. It is also difficult to determine a baseline amount of data being transmitted from each port of the billing collector. Since it is difficult to troubleshoot the problem, the transmission of data may become even slower and cause the billing system to become overloaded and not function properly.

As such, an application to help determine the cause for a problem or backlog in transferring billing data from the billing collector to the billing converter would be beneficial. It would be beneficial to be able to determine statistical baselines for the data to be transmitted from the bill collector to the billing converter.

SUMMARY OF THE INVENTION

The present invention generally relates to a method for analyzing billing packets transmitted from a billing collector to a billing converter. A first packet of data transmitted from a billing collector to a billing converter is received. The first packet includes billing data and a transmission time. A second packet of data being transmitted from the billing converter to the billing collector is received. The second packet includes an acknowledgement of said first packet and a transmission time. A first time difference between the transmission time of the first packet and the transmission time of the second packet is determined. A third packet of data being transmitted from a billing collector to a billing converter may also be received. The third packet comprises billing data and a transmission time. A fourth packet of data being transmitted from the billing converter to the billing collector, wherein the fourth packet comprises an acknowledgement of said third packet and a transmission. A second time difference between the transmission time of the third packet and the transmission time of the fourth packet is determined. The sum of the first time difference and the second time difference is determined.

Another method for analyzing billing packets transmitted is described. The method includes receiving a first packet of data being transmitted from a billing collector to a billing converter. The first packet includes billing data and a current transmission time. The method further determines whether the packet has been previously transmitted from the billing collector to the billing converter, and if so, determines a previous transmission time for the packet. A first time difference between the previous transmission time of the first packet and the current transmission time of the first packet is then determined.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for analyzing transmission of billing data. The system and method of the present invention collects data packets as they are transmitted from billing collector to a billing converter and vice versa. The system and method of the present invention determines the average time per transaction, the number of transactions, the total time for all transactions, the number of retransmissions and number of total times stalled per port from the billing collector.

Figure 1:
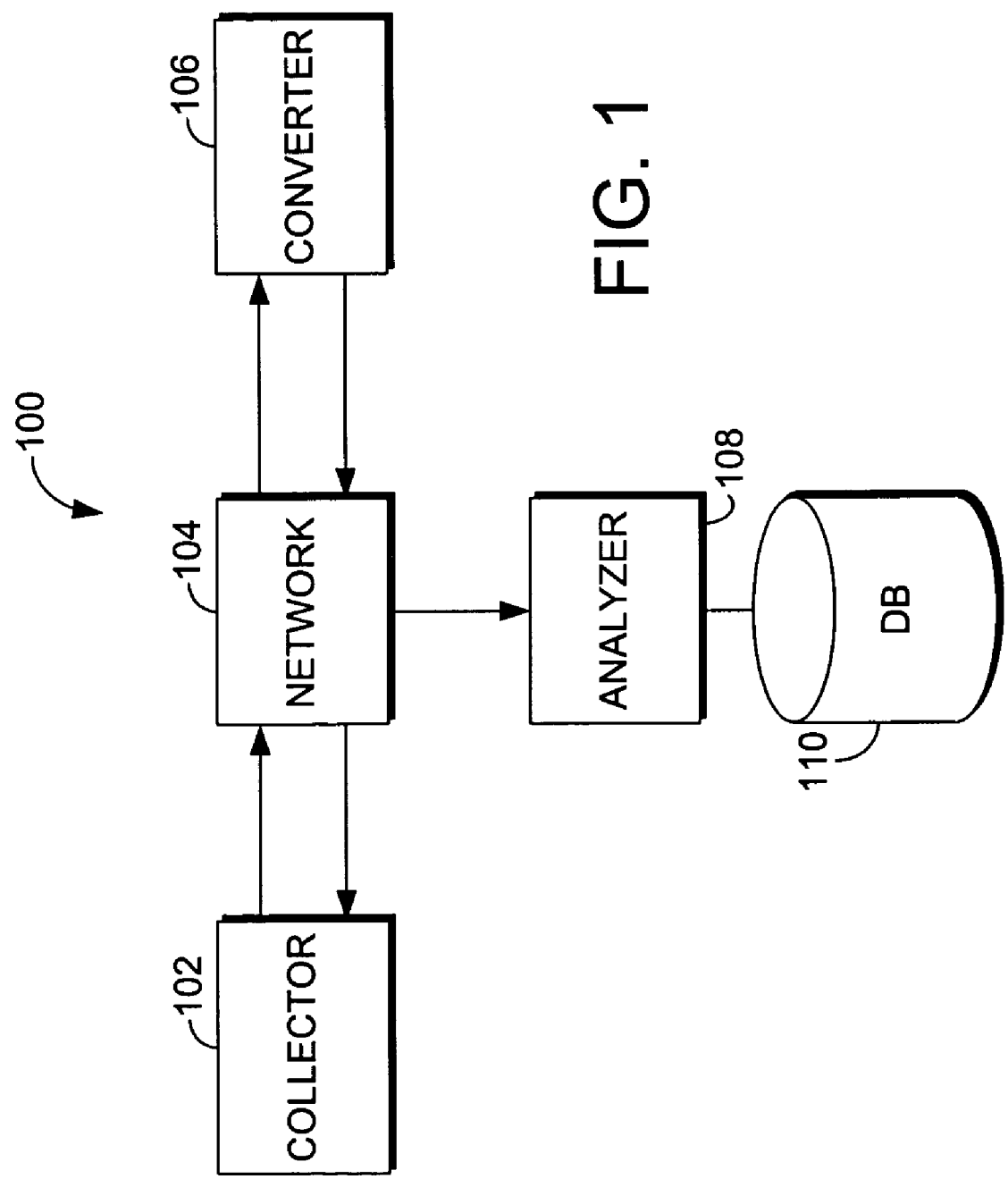
FIG. 1 is a block diagram of the computing system environment suitable for use in implementing the present invention.

With reference to FIG. 1, an exemplary billing system for implementing the present invention is shown. The components of the system 100 include a billing collector 102. An exemplary billing collector is a METAPATH application server in the eMerging Information System (EMIS). The billing collector aggregates billing data that is sent from wireless telephones and other telecommunications equipment. The billing packets collected by the billing collector include data such as who placed the call, who received a call, the time the call was made and duration of the call and Internet usage. Then the raw billing data is sent as packets and collected by the billing collector 102. A packet is a unit of data formatted for transmission on a network. For example, each packet has a header indicating its source and destination, along with the billing data or an acknowledgment message. The packet may also include the transmission time of the packet and an identifier of the particular packet of billing data.

The billing packets are transferred via network 104 to a billing converter 106. By way of examples the network may be an Ethernet switch and/or a network hub. An exemplary billing converter is a MAS application server in the EMIS system. The billing collector 102 receives the packets sent by the billing collector 106 and will further process these packets into a form that may be used for billing clients or for other needed information.

Once a billing packet is received by the billing converter 106, the billing converter 106 sends an acknowledgement message via the network 104 to the billing collector 102, indicating that the billing converter 106 has received the particular billing packet. Millions of packets are sent per second from the billing collector 102 to the billing converter 106. This can cause a slowdown or backlog.

The packets are collected and are stored in database 110 to be used by the analyzer 108. To determine why there may be a backlog or slowdown in the billing feed from the collector 102 to the converter 106 the analyzer 108 analyzes the billing packets sent from the billing collector 102 to the billing converter 106 and the acknowledgement message packets sent from the billing converter 106 to the billing collector 102 indicating that the billing converter 106 has received a particular billing packet from the billing collector 102.

Figure 2:
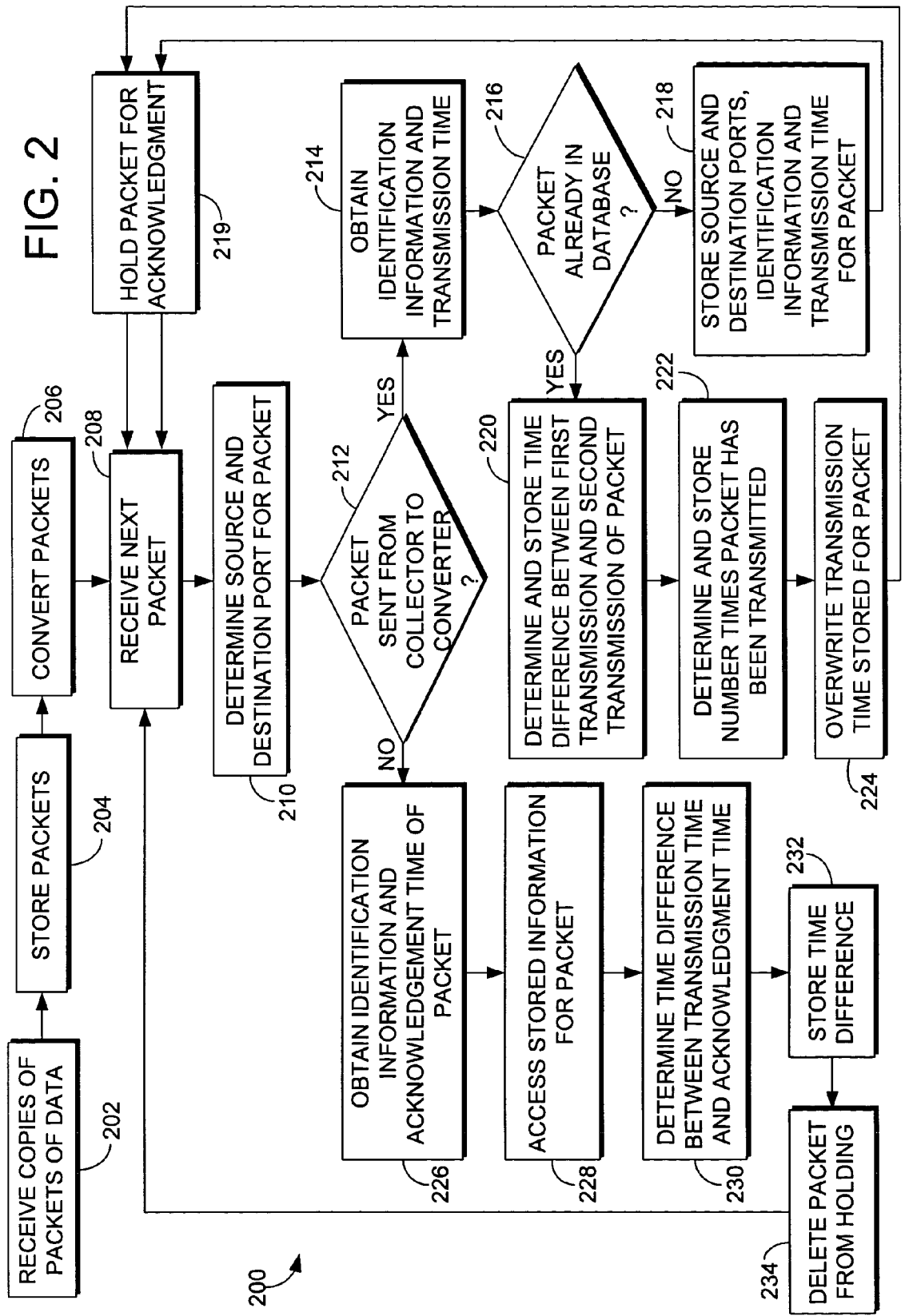
FIG. 2 is a flow diagram of the method and system for analyzing billing feed in accordance with an embodiment of the present invention.

Referring next to FIG. 2, a method for collecting and analyzing delay in the transmission of billing data and from the billing collector 102, and the billing converter 106 is shown. A variety of applications can be used to collect and analyze the transmission of billing data, including a PERL application. At step 202, copies of packets of data sent between the billing collector 102 and the billing converter 106 and vice-versa are received. Packets of billing data are sent from the billing collector 102 to the billing converter 106 and acknowledgement message packets are sent from the billing converter 106 to the billing collector 102 are collected. The packets are collected for a period of time. The period of time may include when the analyzing system is running, for instance for a 20-minute period of time. Alternatively, the system may be programmed to collect packets at regular intervals, for instance for a particular time every day or week. Any size data sample can be used, typically about 500 Megabyte/1 million record range.

At step 204 the packets of data are stored in database 110. At step 206 the packets of data may be converted to a different format if needed. For example, the packets of data are converted from a sniffer version to a libpcap UNIX format. At step 208 the next packet of data is received. In some instances the Ethernet layer of billing data and other unneeded layers of the packet will be removed. At step 210 the source and destination ports for the packet of data are determined. This is determined by looking at the User Datagram Protocol (UDP) layer of the packet to determine the source and destination ports.

Once the source and destination ports are determined at step 212, a determination is made as to whether the packet was sent from the billing collector or the billing converter. If the packet was sent from the billing collector, the identification data and transmission time for the packet of data at step 214 is obtained. The identification data includes an instance or serial number, such as EMIS sequence numbers, but it may be any identifier of the packet of data. The transmission time is the "time-stamp" of the packet of data indicating the time the packet was sent from the billing collector to the billing converter.

At step 216 a determination is made as to whether information for the packet of data has already been stored by locating it by its identification data in the database. If the packet does not already have information stored in the database at block 218 then the source and destination port, the identification data and transmission time for the packet of data are stored for the packet in a database or table. Proceeding to step 219, the stored information for the packet of data is held in the database until there is an acknowledgment from the billing converter. Then at step 208 and the next packet of data to be analyzed is received.

Returning to step 216 if the packet is determined to have data in the database already, the system proceeds to step 220. At step 220, the difference between the previous transmission time of the packet of data and the current transmission time of the packet of data is determined. The "time stamp" of the previous transmission of the packet of data is in the database. The "time stamp" of the current transmission of the packet is obtained from the current packet information. The difference between the two transmission times indicates 1) that the packet had to be transmitted a second time because the first packet sent to the billing converter was not acknowledge and 2) the delay between the current and previous transmission causing a delay in the system. The time difference is stored in the database 110 and/or table.

At step 222, the number of transmissions of this packet is determined by summing all of the transmissions and/or attempted transmissions of this particular packet including the current transmission. The number of transmissions is stored in the database 110. At step 224 the previous transmission time stored for the packet is replaced with the current transmission time for the packet. At step 219 the packet is held for acknowledgement from the billing converter. The packet may be also written to a separate file for further analysis.

Returning to step 212, if it is determined that the packet was from the converter to the collector, at step 226 the identification data and acknowledgement time of the packet is obtained. At step 228 stored data for the packet being acknowledged is obtained from the database 110. The stored information includes an identifier of the packet, the transmission time of the packet and the source and destination port for the packet. At step 230 the difference between the transmission time and acknowledgement time is determined and stored at step 232. The time difference can be used to analyze which ports are experiencing a slowdown or backlog and how long it takes for packets to be sent and acknowledged. At step 234 the packet is deleted from holding and the system receives the next packet of data to be analyzed.

Figures 3, 4:
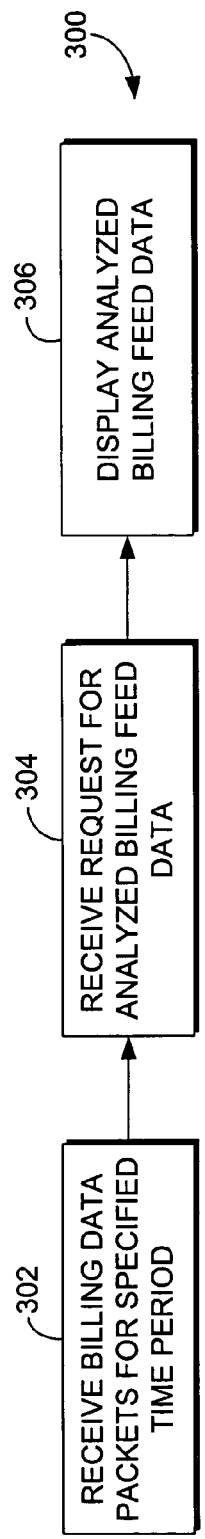
FIG. 3 is a flow diagram of a method for displaying analyzed billing feed data in accordance with an embodiment of the present invention.
FIG. 4 is an exemplary screen shot of analyzed billing feed in accordance with an embodiment of the present invention.

With reference to FIG. 3 a method for displaying analyzed billing feed data 300 is shown. At step 302 packets are received for a period of time. At step 304 a request for analyzed billing data is received. At step 306 the system displays the analyzed transmitted billing data. The analyzed transmitted billing data included a collection of information stored for a particular port including average time per transaction, the number of transactions, the total time for transactions, the number of retransmissions and the total time of stall for the port.

The average time per transaction per port is obtained by summing the differences between the transmission time of the packet and the acknowledgement message time that were calculated in step 230 and dividing by the number of transactions. The total time for transactions is determined by summing the differences between the transmission time of the packet and the acknowledgement message time as calculated in step 230. The average transaction time and the total time for transactions can be helpful in determining a statistical baseline for the number of packets and amount of billing data sent from certain ports of the billing collector. The number of retransmissions is the sum of the retransmissions for all packets of data calculated in step 220. The total time of stall for the port is the sum of all the differences between the stored previous transmission time of a particular packet of data and the current retransmission time as calculated in step 220.

Referring next to FIG. 4, an exemplary screen shot of analyzed billing feed data 400 is shown. The display includes analyzed billing feed for one or more port 402 of the billing collector. The analyzed data includes the average time for transaction 404, the number of transactions 406 and the total time for transactions 408. The analyzed billing feed data also includes the number of retransmissions 410 and the total time of stall 412. For example, port 59306 had an average time per transaction of 0.984 milliseconds. While port 59309 had an average transaction time of 1.020 milliseconds. The total stall time for each port is also displayed. Port 59306 has a total stall time of 30.67 seconds while port 59309 has an average stall time of 27.525 seconds. The display can be used to show statistics on latency and errors per port.

Although the invention has been described with reference to embodiments of the invention and the attached drawing figures it is noted that substitutions may be made in equivalence employed herein without departing from the scope of the invention as recited in the claims. For example additional steps may be added and omitted without departing from the scope of the invention.

The invention claimed is:

1. A method for analyzing billing packets transmitted, the method comprising:
   receiving a first packet of data being transmitted from a billing collector to a billing converter through a first transmission port, wherein said first packet comprises billing data and a current transmission time;
   determining whether the first packet has been previously transmitted from the billing collector to the billing converter, and if so, determining a previous transmission time for the first packet;
   determining a first time difference between the previous transmission time of the first packet and the current transmission time of the first packet;
   receiving a second packet of data being transmitted from the billing collector to the billing converter through the first transmission port, wherein the second packet comprises billing data and a second current transmission time;
   determining whether the second packet has been previously transmitted from the billing collector to the billing converter, and if so, determining a previous transmission time for the second packet;
   determining a second time difference between the previous transmission time of the second packet and the second current transmission time of the second packet; and
   storing the first time difference and the second time differences with indications that the first time difference and the second time difference are related to packets transmitted through the first transmission port.

2. The method of claim 1, wherein be transmitted includes attempted to be transmitted.

3. The method of claim 2, further comprising:
   determining the total number of times the first packet has been transmitted.

4. The method of claim 3, further comprising:
   storing the number of times the first packet has been transmitted.

5. The method of claim 4, further comprising:
   substituting the previous transmission time of the first packet with the current transmission time of the first packet.

6. The method of claim 1, further comprising:
   determining the sum of the first and second time differences to determine total time stalled.

7. The method of claim 6, further comprising:
   displaying the total time stalled.

8. A system for analyzing billing packets transmitted, the method comprising:
   a first receiving component for receiving a first packet of data being transmitted from a billing collector through a first transmission port to a billing converter, wherein the first packet comprises billing data and a current transmission time;
   a first determining component for determining whether the first packet has been previously transmitted from the billing collector to the billing converter, and if so, determining a previous transmission time for the packet; and
   a second determining component for determining a first time difference between the previous transmission time of the first packet and the current transmission time of the first packet;
   a second receiving component for receiving a second packet of data being transmitted from the billing collector through the first transmission port to the billing converter, wherein the second packet comprises billing data and a current transmission time;
   a third determining component for determining whether the second packet has been previously transmitted from the billing collector to the billing converter, and if so, determining a previous transmission time for the second packet;
   a fourth determining component for determining a second time difference between the previous transmission time of the second packet and the current transmission time of the second packet, and
   a fifth determining component for determining the sum of the first and second time differences to determine total time stalled through the first transmission port.

9. The system of claim 8, wherein being transmitted includes attempted to be transmitted.

10. The system of claim 9, further comprising:
    a substituting component for substituting the previous transmission time of the first packet with the current transmission time of the first packet.

11. One or more computer-readable media having computer-executable instructions embodied thereon for performing a method for analyzing billing packets transmitted, the method comprising:
    receiving a first packet of data being transmitted from a billing collector through a first transmission port to a billing converter, wherein said packet comprises billing data and a current transmission time;
    determining whether the first packet has been previously transmitted from the billing collector to the billing converter, and if so, determining a previous transmission time for the first packet;
    determining a first time difference between the previous transmission time of the first packet and the current transmission time of the first packet;
    receiving a second packet of data being transmitted from the billing collector through the first transmission port to the billing converter, wherein the second packet comprises billing data and a current transmission time;
    determining whether the second packet has been previously transmitted from the billing collector to the billing converter, and if so, determining a previous transmission time for the second packet;

determining a second time difference between the previous transmission time of the second packet and the current transmission time of the second packet; and storing the first time difference and the second time differences with indications that the first time difference and the second time difference are related to packets transmitted through the first transmission port.

12. The media of claim 11, wherein being transmitted includes attempted to be transmitted.

13. The media of claim 12, further comprising:
determining the total number of times the first packet has been transmitted.

14. The media of claim 13, further comprising:
storing the number of times the first packet has been transmitted.

15. The media of claim 14, further comprising:
substituting the previous transmission time of the first packet with the current transmission time of the first packet.

16. The media of claim 11, further comprising:
determining the sum of the first and second time differences to determine total time stalled.

17. The media of claim 16, further comprising:
displaying the total time stalled.

* * * * *

UNITED STATES PATENT AND TRADEMARK OFFICE
CERTIFICATE OF CORRECTION

| | | |
|---|---|---|
| PATENT NO. | : 7,573,831 B1 | Page 1 of 1 |
| APPLICATION NO. | : 10/882731 | |
| DATED | : August 11, 2009 | |
| INVENTOR(S) | : Joel Mark Studtmann | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Fourteenth Day of December, 2010

David J. Kappos
*Director of the United States Patent and Trademark Office*